Nov. 9, 1954    L. J. LECHTENBERG    2,693,789
AIR-COOLED INTERNAL-COMBUSTION ENGINE
Filed May 11, 1953    9 Sheets-Sheet 1
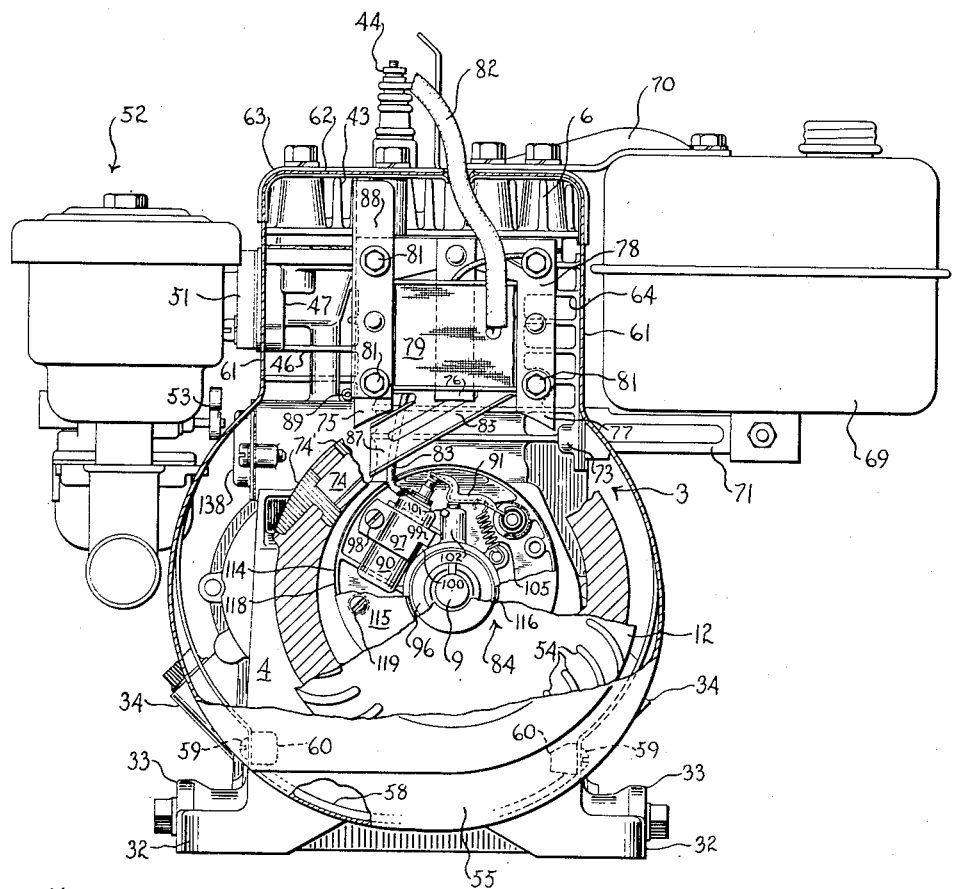
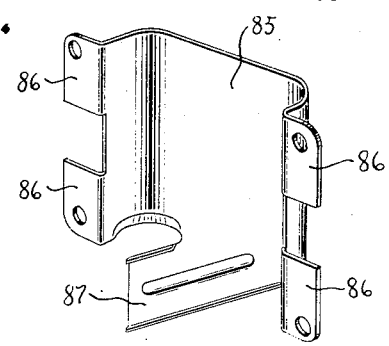
Leo J. Lechtenberg
Joseph R. Harkness

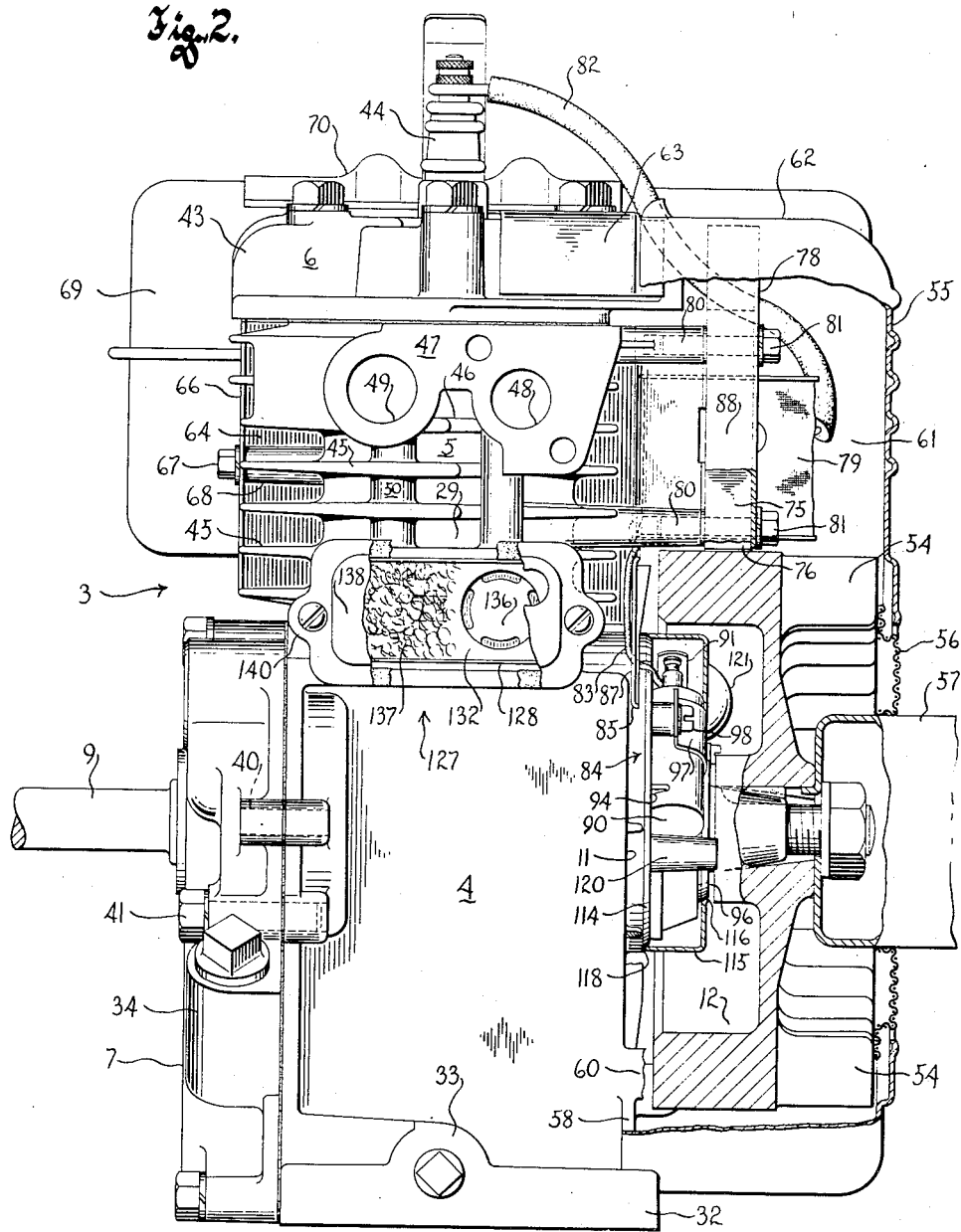

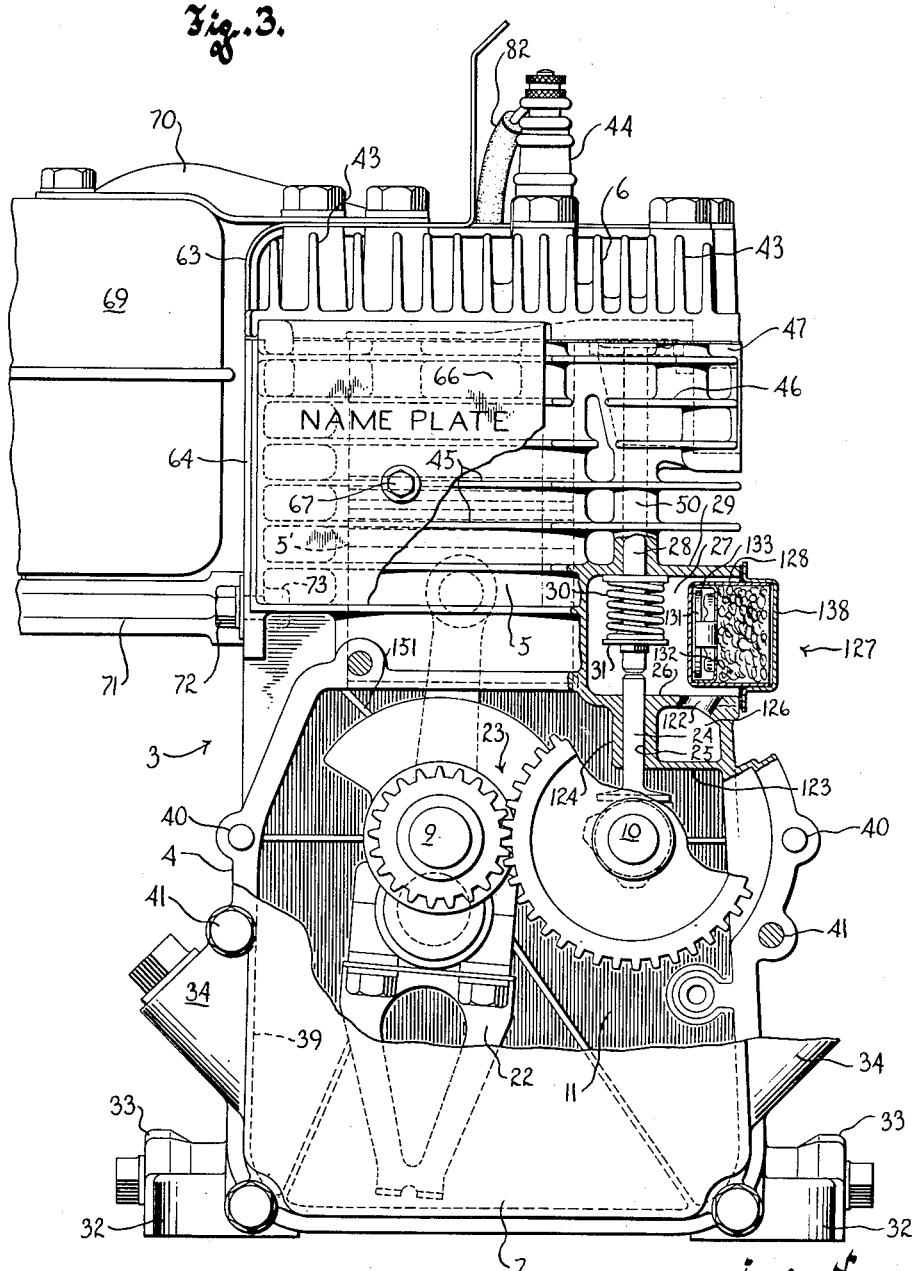

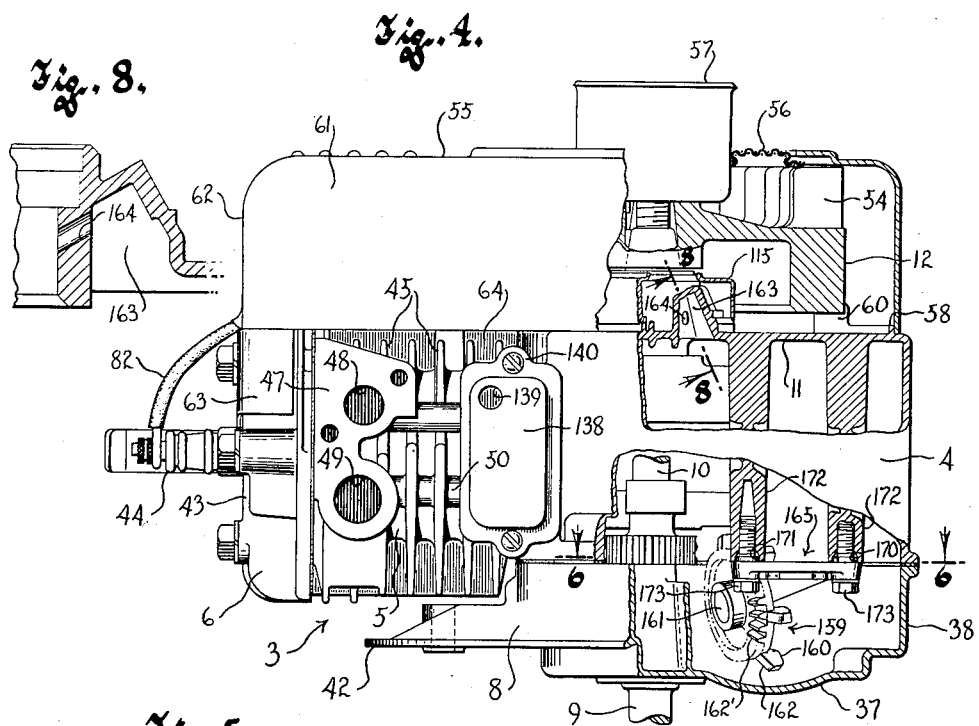

Nov. 9, 1954     L. J. LECHTENBERG     2,693,789
AIR-COOLED INTERNAL-COMBUSTION ENGINE
Filed May 11, 1953     9 Sheets-Sheet 5
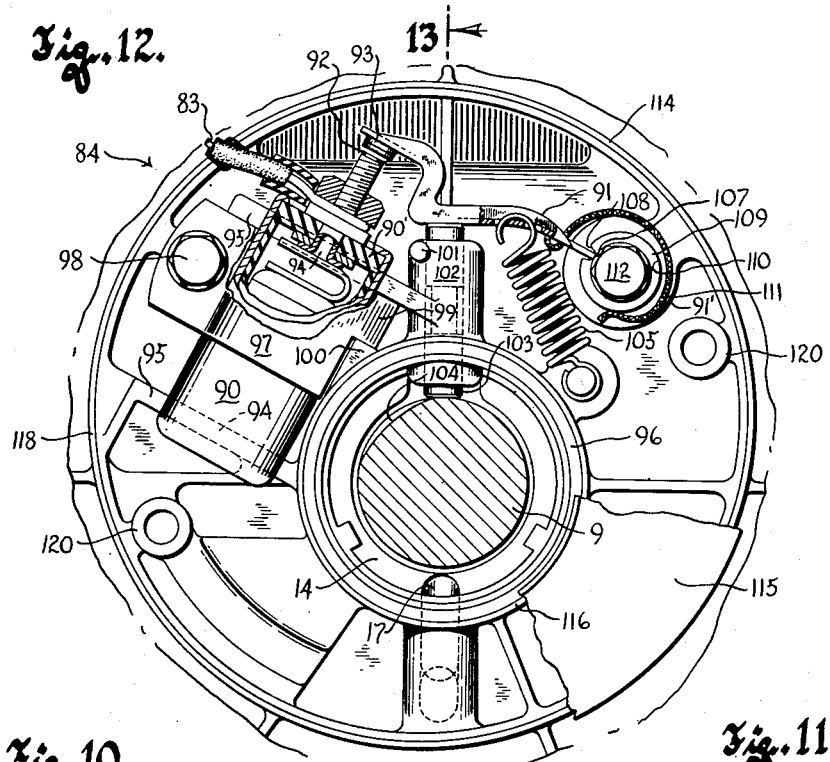
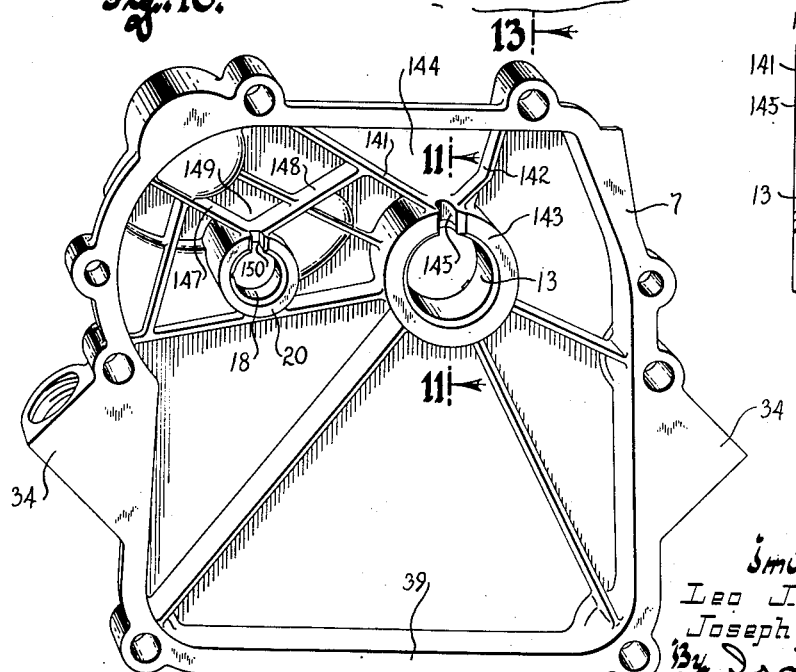
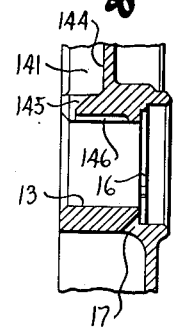

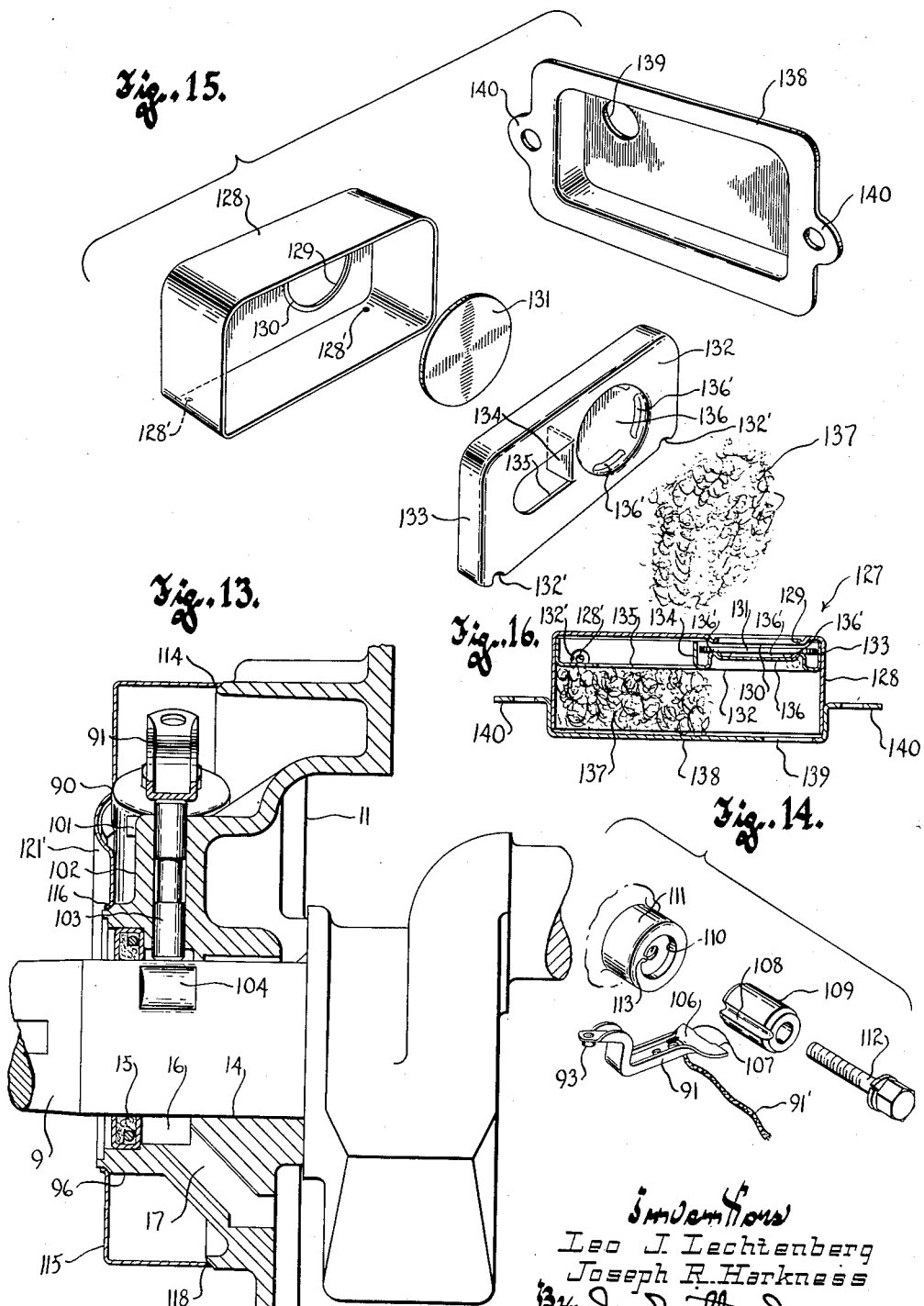

Nov. 9, 1954     L. J. LECHTENBERG     2,693,789
AIR-COOLED INTERNAL-COMBUSTION ENGINE

Filed May 11, 1953     9 Sheets—Sheet 7

Inventors
Leo J. Lechtenberg
Joseph R. Harkness
By Ira Milton Jones
Attorney

Nov. 9, 1954     L. J. LECHTENBERG     2,693,789
AIR-COOLED INTERNAL-COMBUSTION ENGINE
Filed May 11, 1953     9 Sheets-Sheet 8
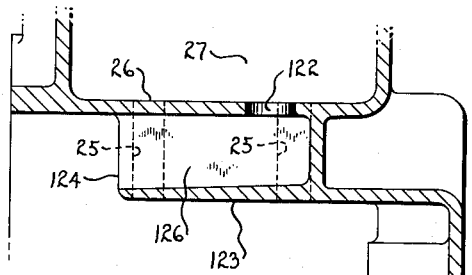
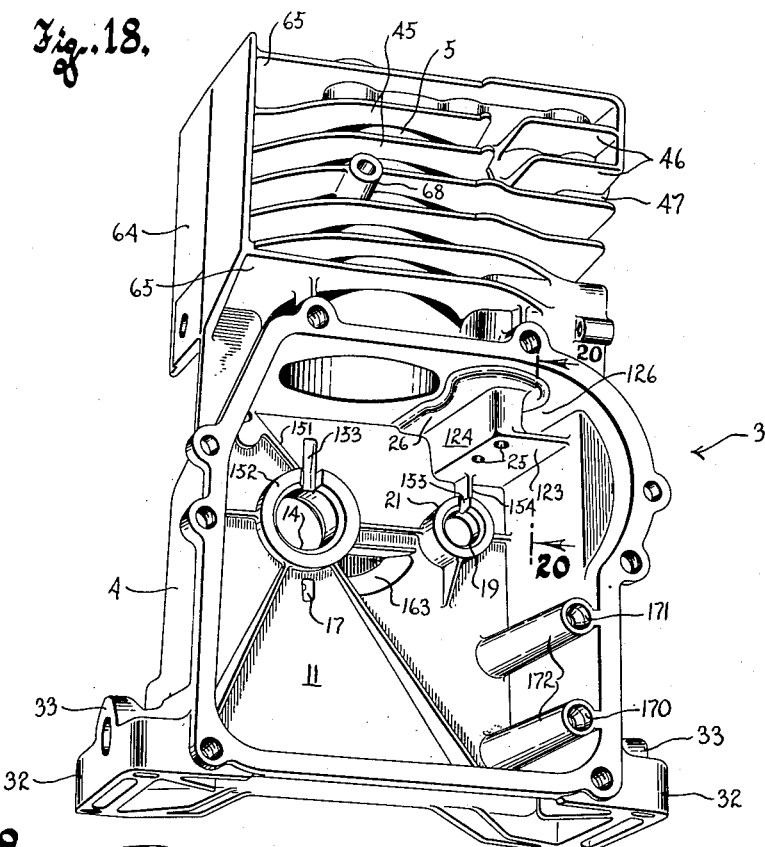
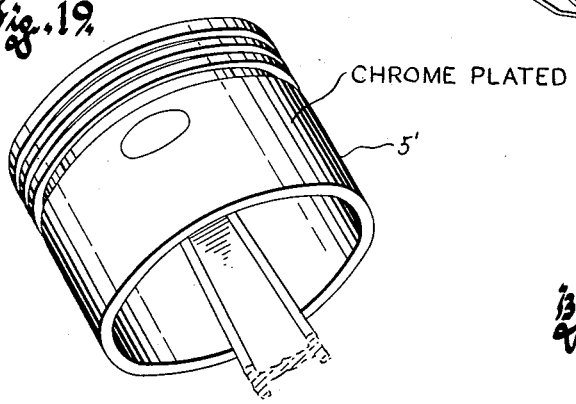
CHROME PLATED

United States Patent Office 2,693,789
Patented Nov. 9, 1954

2,693,789

AIR-COOLED INTERNAL-COMBUSTION ENGINE

Leo J. Lechtenberg, Milwaukee, Wis., assignor to Briggs & Stratton Corporation, Milwaukee, Wis., a corporation of Delaware Application May 11, 1953, Serial No. 354,056

16 Claims. (Cl. 123—195)

This invention relates to internal combustion engines and refers more particularly to single cylinder, air cooled, four-stroke cycle engines of the type widely used on power lawn mowers and many other well-known appliances.

Manufacturers of such engines are constantly being beseached by producers of power lawn mowers and other portable appliances and equipment to reduce the weight and price of their engines. The entire engine industry is thus well aware of the urgent demand made upon it to produce a lighter, less expensive engine but, of course, the attainment of this objective may not be at a sacrifice of power output, reliability or ruggedness.

The underlying and motivating objective of this invention thus is to produce an engine which delivers more horsepower per dollar of cost and pound of weight than has heretofore been achieved.

Cost reduction obviously can be attained by simplification of the engine and by reducing the number of component parts requiring assembly. With a view toward taking full advantage of this expedient, the present invention has as its purpose to provide an internal combustion engine of the character described wherein many of the individual component parts of engines as they had been built before are an integral part of either one of two main castings which together with the cylinder head comprise the body of the engine.

More specifically, it is the purpose of this invention to provide an engine wherein a single main casting, which may be either a die casting or a sand casting, provides not only the cylinder with its encircling heat dissipating fins, and all but one wall of the crankcase, but in addition has many of the parts which heretofore were assembled as separate units as, for instance, air directing walls, oil deflecting baffles and the like, incorporated in the casting as an integral part thereof. Since the greatest economy is effected by die casting the main parts of the engine body, this form of casting is preferred over the sand casting method. Nevertheless, it will be understood that either casting method may be followed so that where the term "die casting" is used hereinafter it is not intended to rule out sand casting.

One of the features of the invention resides in the provision of an air directing wall or baffle formed as an integral part of the cylinder-crankcase casting tangentially to all of the fins on the cylinder so that a portion of the die in which this wall is cast may be used as a large capacity gate through which the molten metal may be quickly passed into the cylinder-forming part of the die. This assures the desired metal density in the cylinder walls where casting defects would be most serious.

In keeping with the overall objective of reducing the cost of the engine and simplifying its assembly, it is another object of this invention to use the metal name plate with which engines have always been equipped to form part of the air directing means, and to this end the name plate is fastened to the side of the cylinder with one edge thereof contiguous to the baffle which is cast integral with the cylinder and extends across an adjacent side of the cylinder.

Another very important way in which the cost of the engine can be reduced is by so designing and constructing the engine that it may be adapted to a wide variety of uses with a minimum amount of change in its construction.

Heretofore the ordinary single cylinder, internal combustion engine was so designed that to adapt the same to different uses often entailed an entirely new cylinder-crankcase casting. This would rule out die casting and the obvious savings effected thereby since the cost of the dies involved would be prohibitive. By contrast, the engine of this invention is so designed that it may be adapted to a wide variety of uses without in anywise changing the cylinder-crankcase casting. Only the cover of the crankcase need be changed, and since the dies involved in the production of the cover castings are by no means as complicated and expensive as those required for the cylinder-crankcase casting, even die casting the cover units is feasible, and for shorter runs where the cost of tooling up is not warranted, sand castings may be employed for the covers.

To illustrate how easily the engine of this invention may be adapted to different uses, it might be noted that the adaptation of an engine intended for ordinary general utility with the engine operating in an upright fashion, that is with its cylinder vertical, to horizontal operation as in rotary type lawn mowers, merely requires the simple substitution of one cover casting for another. By the same token the engine can be adapted to many different types of horizontal and vertical mountings, and to various special uses, as will be hereinafter more fully described.

Since lubrication of an engine operating with its cylinder horizontal presents problems not encountered when the engine is operating in a vertical position, the side of the engine which is lowermost (in the horizontal position of the engine) must be constructed to provide an oil sump and since changes in the cylinder-crankcase casting are to be avoided, this side of the engine is formed by the crankcase cover, which as noted before, may be designed to satisfy any requirement. Also, means must be provided to lift the oil from the sump to the bearings in which the crankshaft and cam shaft turn. While this can, of course, be done by a pump, in the interests of economy it is desirable to avoid the use of a pump, and accordingly this invention employs the oil slinger which forms the subject matter of the pending application Serial No. 296,393, filed June 30, 1952, now Patent No. 2,669,322.

With a view toward simplifying the assembly of the slinger and assuring more efficient operation thereof, this invention has as another of its objects to provide a simple mounting bracket for the slinger which may be quickly secured to a wall of the crankcase and automatically located, during its securement, in a predetermined position which will assure the proper location of the oil slinger, both with respect to the bearings it serves and the timing gear which drives it.

Another object of this invention is to provide added assurance against oil leakage from the crankcase through the necessary breather opening, and in this connection it is a further object of the invention to afford such assurance by the simple expedient of a properly placed baffle cast integral with the crankcase.

With a view toward improving the air breather for the crankcase it is another object of this invention to vent the crankcase through a pocket or compartment in which the valve springs are located and with which the tappet openings communicate, and to control the flow of air to and from this valve spring pocket or compartment by means of a novel breather valve assembly formed as a cover for the valve spring compartment.

Again with a view toward achieving utmost simplicity and reducing assembly time to a minimum, this invention has as another of its objects to provide an improved manner of mounting the elements of the magneto ignition system upon the engine.

In this connection it is another object of this invention to provide a simple stamped sheet metal heat shield between the cylinder and the ignition coil which is clamped in place by the attachment of the coil armature to the side of the crankcase with a part thereof arranged to protect the lead to the breaker mechanism from contact with the flywheel.

Still another object of this invention is to provide a novel breaker mechanism wherein the stationary contact is mounted on one end of the condenser to thereby obviate the need for providing a special insulated mounting for the stationary contact and at the same time enable the condenser mounting to be used for adjustment of the breaker point spacing.

In this connection it is a still further object of the invention to achieve simplicity and low cost by casting mounting means for the condenser and the breaker mechanism integrally with the crankcase casting.

Still another object of this invention is to provide a simple stamped sheet metal dust cover for the breaker mechanism which is held in place by two screws and upon being secured in place automatically coacts with portions of the casting wall upon which it is mounted to effect a tight fit.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Figure 1 is an end view of the engine of this invention viewing the same from the flywheel end of its crankshaft, parts of said view being broken away to show structural details;

Figure 1A is a perspective view of the heat shield located between the ignition coil and the adjacent side of the cylinder;

Figure 2 is a side view of the engine shown in Figure 1 with parts thereof broken away and in section and with the carburetor removed for clarity;

Figure 3 is a view of the power take-off end of the engine, with a substantial part of the crankcase cover broken away and parts of the cylinder-crankcase casting broken away and shown in section;

Figure 4 is a side view of the engine adapted for horizontal operation, that is, with its cylinder horizontal and showing the same equipped with a crankcase cover especially designed to adapt the engine for use as the power unit of a rotary type lawn mower, parts of said view being broken away and shown in section to better illustrate structural details;

Figure 5 is a perspective view of the crankcase cover casting by which the engine is adapted for use with its cylinder horizontal;

Figure 6 is a fragmentary detail sectional view taken through Figure 4 on the plane of the line 6—6 and illustrating particularly the manner in which the oil slinger is mounted;

Figure 7 is a perspective view of the mounting bracket for the oil slinger;

Figure 8 is a fragmentary detail sectional view through Figure 4 on the plane of the line 8—8 and illustrating the pocket in the upper wall of the crankcase into which oil is thrown by the slinger to feed the upper crankshaft bearing;

Figure 9 is a fragmentary detail sectional view through Figure 5 on the plane of the line 9—9 and illustrating the oil filler and drain ports;

Figure 10 is a perspective view of the crankcase cover used when the engine is intended for general utility with the cylinder in a vertical position;

Figure 11 is a fragmentary detail sectional view through Figure 10 on the plane of the line 11—11;

Figure 12 is a sectional view through the flywheel end of the crankshaft illustrating the magneto assembly of the engine, the major portion of the cover therefor being broken away;

Figure 13 is a detail sectional view through Figure 12 on the plane of the line 13—13, but to better illustrate the manner in which the breaker mechanism of the magneto is operated this view showes the crankshaft turned 90 degrees from the position in which it is shown in Figure 12;

Figure 14 is a perspective view of the breaker arm and the mounting therefor illustrating the parts disassembled;

Figure 15 is an exploded perspective view of the air breather assembly through which the crankcase interior is vented;

Figure 16 is a longitudinal sectional view through the air breather assembly;

Figure 18 is a perspective view of the cylinder-crankcase casting from the other side and looking into the interior of the crankcase;

Figure 19 is a perspective view of the piston;

Figure 20 is a detail sectional view through Figure 18 on the plane of the line 20—20;

Figure 22:
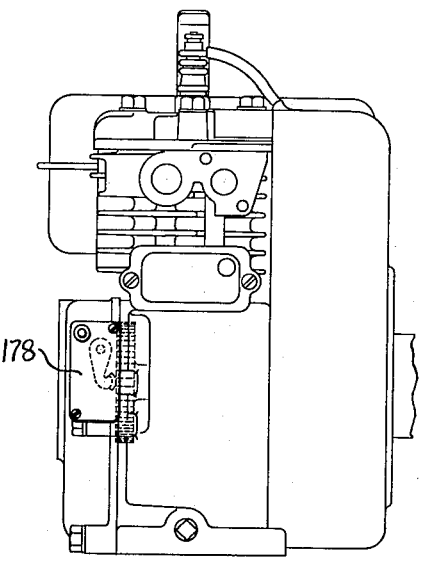
Figure 23:
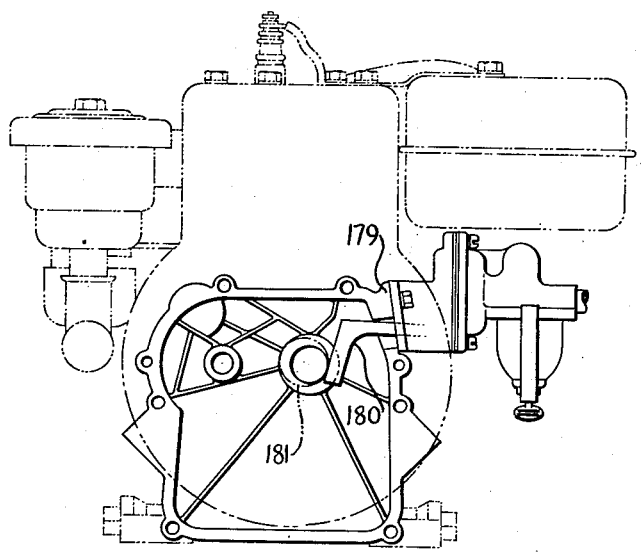

Figure 22 is a side view of the engine showing the application of an externally located breaker mechanism, also without need for altering the crankcase-cylinder casting; and Figure 23 is a view looking into the crankcase cover with the outline of the engine illustrated in broken lines and showing the manner in which a fuel pump may be added and operated without altering the crankcase-cylinder casting.

Referring now particularly to the accompanying drawings in which like numerals indicate like parts throughout the several views, the numeral 3 designates generally the crankcase-cylinder casting of the engine, consisting of a crankcase portion 4 and a cylinder 5. This main casting together with a cylinder head 6 and a crankcase cover casting 7 or 8 (depending upon the intended use of the engine) comprises the entire body of the engine. For ordinary general utility where an upright disposition of the engine is desirable, the crankcase cover 7 is used, but where the engine is intended to operate with its cylinder axis horizontal as in the driving units of rotary type lawn mowers, the cover 8 is used. These covers are best illustrated respectively in Figures 10 and 5.

The bearings for the engine crankshaft 9 and its cam shaft 10 are mounted in the cover casting and the end wall 11 of the crankcase-cylinder casting opposite the cover, and to enable adapting the engine to any one of a wide variety of uses without need for changing the crankcase-cylinder casting the flywheel 12 is mounted upon the end of the crankshaft which protrudes from the casting wall 11 and the opposite power take-off end of the crankshaft protrudes from the cover casting regardless of which of the two types of covers is employed.

The crankcase-cylinder casting 3, the cylinder head 6 and the crankcase cover 7—8 are cast of aluminum alloy, preferably as die castings, and the crankshaft and cam shaft run directly in bearings bored in the cover casting and the opposite wall of the crankcase-cylinder casting. In other words, the bearings are not bushed, but can be bored out to receive bushings (not shown) after the engine has been in service long enough to cause serious bearing wear.

The crankshaft bearings 13 and 14 are each equipped with an oil seal 15 mounted in a counterbore at the outer end of the bearing to prevent loss of oil from the crankcase, and each of these bearings has an annular oil collecting chamber 16 inwardly of its oil seal to receive the oil which flows outwardly along the shaft. Oil which accumulates in these collecting chambers is returned to the crankcase interior by passages 17.

The cam shaft bearings 18 and 19 formed respectively in the crankcase cover and the opposite wall 11 are likewise bushingless, but as distinguished from the crankshaft bearings do not extend through the crankcase walls. Instead these cam shaft bearings are formed by wells closed at the bottom and provided largely by bosses 20 and 21, respectively, projecting inwardly from the casting walls.

The crankshaft is of conventional construction but the piston 5' though of conventional design and cast of aluminum alloy is distinguished by the fact that it is plated with chromium or some other suitably hard wearing metal. By this expedient it is possible to have both the cylinder and the piston formed of the same basic die casting metal without incurring the cost of lining or plating the cylinder wall, for contrary to previous belief, it has been conclusively demonstrated that the piston rings will not unduly wear a naked, unprotected aluminum alloy cylinder wall. The saving thus effected is substantial since to plate the piston costs but a fraction of what it costs to either plate or line the cylinder wall.

The cam shaft 10, which is of conventional construction is driven from the crankshaft by the usual set of timing gears 23 which are located adjacent to the crankcase cover, and when the engine is intended for general utility, the connecting rod has an oil splashing dipper 22 secured thereto to effectively splash the oil contained in the crankcase up into all parts of the crankcase interior and into the cylinder.

Valve tappets 24 operated by the cam shaft are slidably received in relatively long holes 25 drilled through a wall 26 of the crankcase-cylinder casting. The outer ends of these holes open to a valve spring pocket or compartment 27 in which the tappets abut the valve stems 28 to lift the valves in the customary manner. The valve stems enter the compartment 27 through its top wall 29 and the valve springs 30 are confined between this top wall 29 and spring seats 31 on the lower ends of the valve stems.

The valve spring pocket or compartment 27 not only affords a convenient enclosure for the valve springs but, as will be hereinafter more fully described, forms part of the means by which the crankcase interior is ventilated.

If the engine is intended for operation with its cylinder vertical the crankcase-cylinder casting 3 is provided with integral mounting feet 32 and bosses 33 at opposite sides of the casting, either one of which may be drilled and tapped to provide an oil drain port. But when the engine is intended for operation with its cylinder axis horizontal, the feet and drain port are not needed and hence those portions of the die or mold in which the feet and bosses 33 are formed would be blocked off. Also, when the engine is intended for general utility and the cover 7 is employed the oil filler port may be located at either side of the engine, and to provide for such alternate location the cover casting 7 has a pair of bosses 34 either of which may be drilled and tapped to provide the oil inlet port.

If the engine is intended for operation with its cylinder horizontal and the other cover casting 8 is used both the oil inlet port 35 and the oil drain port 36 are in the cover casting as best shown in Figures 5 and 9. These two ports are disposed in parallel juxtaposition, one extending down from the top of the cover casting and the other extending up from the bottom thereof so that in drilling out the ports they are communicated with one another and with the interior of the cover which has a relatively deep dish-shaped formation with a bottom wall 37 and side walls 38 extending upwardly therefrom. The gasket face formed by the outer edges of the side walls 38 has the same shape as the gasket face formed by the edges of the side walls 39 of the cover casting 7 so as to interchangeably fit the open side of the crankcase. Regardless of which cover is employed it is accurately located by dowel pins 40 and secured in place by screws 41.

If the engine is intended for use as the power unit of a rotary type lawn mower the cover casting 8 has a mounting flange 42 cast integrally therewith. This flange seats upon and is secured to the deck of the lawn mower (not shown) to firmly mount the engine with the power take-off end of its crankshaft extending down below the deck.

The cylinder head 6 is of conventional construction with cooling fins 43 cast integrally therewith, and has the usual spark plug 44 mounted therein. The cylinder cooling fins 45 are cast integrally with and encircle the cylinder 5, and cooling fins 46 are cast integrally with a boss-like portion 47 of the crankcase-cylinder casting in which the intake port 48 and the exhaust port 49 are located, the fins 46 being in line with the adjacent cylinder cooling fins 45. Below the boss-like portion 47 the cylinder fins 45 are extended to also embrace the portion 50 of the crankcase-cylinder casting in which the stem 28 of the exhaust valve slides.

The boss-like portion 47 provides a flat face against which an attaching flange 51 of the carburetor indicated generally by the numeral 52 is bolted. The carburetor with its air cleaner is one complete fully assembled unit, the placement of which on the engine requires no more than the fastening of the flange 51, the connection of the gas line and the connection of a driving link (not shown) between the customary air vane governor and the throttle valve crank 53.

The flywheel 12 is equipped with the customary fan blades 54 which induce a flow of cooling air into the inlet of a shroud 55 and from the outlet thereof against the adjacent side of the cylinder. The inlet of the shroud is protected by the customary rotary screen 56 which is preferably mounted upon a rope starter pulley 57 suitably secured to the adjacent end of the crankshaft.

The inner portion of the shroud 55 is substantially cylindrical and snugly fits the underside of a correspondingly shaped ridge 58 with the adjacent edge of the shroud lying flat against the face of the casting wall 11. The shroud is held in this position by screws 59 threaded into bosses 60 on the casting. The upper portion of the shroud has substantially flat opposite side walls 61 connected by a top wall 62. The edge of this top wall is contiguous to a separate sheet metal cylinder head cover 63 disposed across the top of the cylinder head fins to direct part of the air issuing from the shroud across the top of the cylinder head between the cooling fins thereon.

At the side of the engine opposite the carburetor is a thin flat wall 64. This wall serves several purposes. It is cast integrally with the crankcase-cylinder casting and is tangentially contiguous to and joins with all of the cylinder cooling fins 45 extending laterally to opposite sides of the median plane of the engine to terminate in straight parallel edges which lie in planes substantially tangent to the cylinder cooling fins and parallel to the said median plane of the engine.

The uppermost and lowermost cylinder cooling fins have substantially triangular corner portions 65 which join with the flat wall 64 and coact therewith to define a transversely extending air passage through which flows the air leaving the adjacent portion of the shroud, the wall 64 being contiguous to the edge of the adjacent side wall 61 of the shroud so as to form in effect an extension of said shroud wall.

The air directing effect of the flat wall 64 in conjunction with the corner portions 65 of the upper and lower cooling fins is continued by the engine's customary stamped metal name plate 66. A single screw 67 secures the name plate across the side of the cylinder opposite the shroud with one edge of the name plate contiguous to the adjacent edge of the flat wall 64 and its upper and lower edges contiguous to the adjacent edges of the top and bottom cooling fins. The name plate thus coacts with the wall 64 to direct the cooling air and cause it to effectually contact the cooling fins. It will be appreciated that this arrangement eliminates the curved air shield which heretofore was separately attached to the engine.

By virtue of the fact that the wall 64 is cast integrally with the crankcase-cylinder casting and joins with all of the cylinder cooling fins in the manner described, still another very important advantage is obtained, for as will be apparent to those skilled in the die casting art, a portion of the die in which the wall 64 is cast provides an excellent gate through which the molten metal may rapidly flow to quickly fill up the portions of the die in which the cylinder per se is cast. This assures the desired metal density in that portion of the casting where imperfections would be most serious.

Also, since the wall 64 is thin and is joined with each of the cylinder cooling fins it provides additional extended surface for the cylinder to thus assure more rapid dissipation of the heat generated in the engine.

It should also be observed that the wall 64 serves to hold the name plate against rotation about its fastening screw. This enables the use of a single screw to hold the name plate in place and the boss 68 into which this fastening screw is threaded can be conveniently formed as an enlargement of one of the cooling fins 45.

Still another advantage of the wall 64 is the protection against breakage which it affords the cooling fins during handling of the engine before the gas tank is mounted.

The fuel tank 69 is conveniently supported by a bracket arm 70 bolted to the top of the cylinder head and a bracket 71 bolted to the outer face of the wall 64 by a screw 72 which is tapped into a boss 73 at the back of the wall 64. Hence, the wall 64 is interposed between the fuel tank and the engine cylinder and shields the fuel tank against the heat radiated from the cylinder, the heat thus intercepted by the wall 64 being carried away by the cooling air flowing across its inner surface.

The ignition system of the engine is of the flywheel magneto type and accordingly the flywheel has a permanent magnet 74 embedded in its rim, the pole pieces 74' of which sweep past the three legs 75, 76 and 77 of a laminated armature 78 having the customary coil 79 mounted upon its center leg 76. In the past where flywheel magnetos have been used on engines of this kind it has been customary to assemble the stator of the apparatus upon a mounting plate which in turn was mounted upon the engine. In the present invention the need for such plate mounting of the stator is eliminated by the fact that the stator armature is bolted directly to the side of the crankcase-cylinder casting, and to this end the casting has four supporting posts 80 extending from the side of the cylinder and into which the fastening screws 81 are screwed. The holes in the armature through which the clamping screws pass are sufficiently large to permit the armature to be adjusted as required to give equal definite air gaps between its two outer legs and the rotor.

One end of the high tension secondary of the coil is, of course, connected to the center terminal of the spark plug through the customary spark plug lead 82 and one end of the primary winding is connected by a lead 83 to one of the contacts of the breaker mechanism indicated generally by the numeral 84 and which, as will be hereinafter more fully described, embodies some rather novel features.

The lead 83 must pass under the rim of the flywheel and to protect the same against contact with the flywheel a combined heat shield and guard 85 is provided. This unit is best illustrated in Figure 1A. It is mounted in place by being clamped between the armature and the posts 80, the clamping screws 81 passing through holes in flanges 86 which extend from opposite edges of the unit. The main body of the unit lies between the coil and the adjacent side of the cylinder and thus constitutes a heat shield to protect the coil from the heat radiated by the cylinder and to aid in this function the unit is stamped from smooth surfaced aluminum or other highly reflective metal.

The wire guarding function of the unit is performed by an arm 87 projecting from the body of the unit and positioned to lie closely adjacent to the side of the engine over the lead 83 as clearly shown in Figures 1 and 2.

Two of the fastening screws 81 by which the stator armature is held in place also serve to mount a stamping 88 which provides a deflector within the air shroud and a mounting 89 for the governor vane (not shown).

The breaker assembly 84 is mounted directly upon the casting side wall 11 and comprises a condenser 90, a breaker arm 91, a pair of normally open breaker contacts or points 92 and 93 and mechanism to effect periodic engagement thereof. One of the features of the breaker mechanism resides in the fact that one of the breaker contacts is mounted directly on one end of the condenser 90. This enables the insulating bushing 90' of the condenser to serve a dual function. Not only does it insulate the ungrounded condenser terminal but also the ungrounded breaker contact. In addition this construction enables the condenser mounting to provide for the adjustment of the breaker point spacing for by sliding the condenser axially one way or the other the spacing of the breaker points is quickly and easily adjusted.

To this effect the condenser and breaker point assembly is seated in a cradle formed by round bottomed notches 94 in a pair of parallel ribs 95 cast integral with the wall 11 at one side of a hub 96. The hub 96 is also integral with the wall 11 and forms part of the bearing for the adjacent end of the crankshaft.

A strap 97 arched across the top of the condenser and drawn down tight by a clamping bolt 98 serves to hold the condenser firmly against displacement from any desired position of axial adjustment. To prevent rotation of the strap 97 about the screw 98 during the tightening thereof and during axial motion of the condenser for breaker point adjustment a projection 99 on the outer end of the strap is received between an abutment 100 and the adjacent rib 95.

Endwise adjustment of the condenser, may entail slight loosening of the screw 98. This done, a screw driver or other similar tool may be inserted between a lug 101 and the adjacent end of the condenser so that using the lug as a fulcrum the condenser may be easily slid in a direction to increase the spacing between the breaker points, and the adjacent boss 120 may be used as a fulcrum for sliding the condenser in the opposite direction to decrease the breaker point spacing.

The lug 101 projects from a boss 102 which is radial to the hub 96 and is bored to slidably receive a breaker arm operating pin 103. This pin engages the underside of the breaker arm and rides upon the adjacent surface of the crankshaft to drop down onto a cam 104 in the crankshaft and thereby enable a breaker spring 105 acting on the arm 91 to momentarily close the breaker contacts once each revolution of the crankshaft, good electrical grounding of the breaker arm being assured by a flexible jumper 91' having one end thereof secured to the arm and its other end secured to the pivot for the arm.

The manner in which the breaker arm 91 is mounted exemplifies the extent to which this invention has gone to reduce the cost of an engine and simplify its assembly. As best shown in Figure 14 the breaker arm is stamped from sheet metal and has a wide flat mounting end 106 with aligned fulcrum edges 107 which are received in a longitudinal groove 108 in a pivot post 109. The post 109 to which one end of the grounding jumper 91' is secured is stepped into a socket 110 in the outer end of a boss 111 cast as an integral part of the wall 11 and a screw 112 passing through the post 109 and threaded into the boss secures the post to the boss.

Correct angular placement of the groove 108 is assured by a small key 113 integral with the boss 111 and extending in from the side of the socket 110 to enter the adjacent end of the groove 108. This locates the post 109 and holds it from turning.

The lead 83 which connects one end of the primary coil with the breaker contact 92, of course, also connects with the adjacent terminal of the condenser, and it is to be understood that the opposite terminal of the condenser is grounded as is also the movable breaker contact (via the jumper 91') and the common terminal of the primary and secondary windings.

The entire breaker mechanism is housed within a dustproof enclosure formed conjointly by a circular rim 114 on the casting wall 11 and a stamped metal cover 115. The cover 115 is in the form of a small inverted cup having a hole in its end wall to accommodate the crankshaft. The edge of this hole is slightly flared and engages a conical edge 116 on the hub 96, and in like manner the peripheral edge of the cup fits a conical edge 118 on the circular rim 114. The parts are of such relative dimensions that upon drawing the cover down in place by two screws 119 threaded into bosses 120 extending up from the wall 11 a firm engagement is first established between the edge of its hole and the hub and thereafter the peripheral edge of the cover is pulled down onto the beveled edge 118 of the circular rim, it being understood that the bottom wall of the cover is sufficiently flexible or resilient to allow such sequential engagement. This achieves a dust-tight fit between the cover and the casting, and to complete enclosure the notch in the edge of the rim 114 through which the lead 83 enters the breaker housing is sealed with a suitable mastic.

To accommodate the mounting for the breaker arm 91 and the condenser 90 the adjacent portions of the end wall of the cover are bulged out as at 121 and 121'.

Crankcase ventilation, as hereinbefore suggested, is accomplished with a minimum loss of oil from the crank case. The need for ventilating the crankcase arises from the fact that as the piston descends it tends to compress the air in the crankcase, and as it rises on its compression stroke there is a certain amount of "blow-by" past the piston rings from the combustion chamber. Thus unless the crankcase is vented the pressure therein builds up and causes undue leakage of oil past the oil seals and gasket joints. The means provided by this invention for ventilating the crankcase not only eliminates such undesirable pressure but in fact actually produces a partial vacuum in the crankcase. To achieve this result without loss of oil from the crankcase the air is lead from the crankcase by a very tortuous passage which includes the valve spring compartment 27 and comprises a hole or port 122 in the bottom wall 26 of this compartment, a pocket 126 formed by a baffle 123 in coaction with adjacent walls of the crankcase and a novel air breather assembly 127 which forms a cover for the valve spring compartment.

As best shown in Figure 20 the port 122 is located between the plane of connecting rod motion and the end wall 11 of the crankcase. The baffle 123 is formed as an integral part of the crankcase-cylinder casting and projects from its end wall 11 across the mouth of the port, being preferably a continuation of the bottom of the lug-like portion 124 in which the valve tappets are mounted. Since the baffle 123 extends from the casting wall 11 almost to the open side thereof it coacts with the adjacent walls of the casting to define the pocket 126 which forms a tortuous path of communication between the port 122 and a "quite" relatively oil-free zone of the crankcase interior. Hence, very little oil is carried from the crankcase through the port 122. That which does leave the crankcase through this port is trapped by the breather assembly 127 and returned to the crankcase.

The breather assembly 127, as best shown in the exploded perspective view Figure 15, comprises a stamped oblong box 128 having a hole 129 in its bottom wall, the edge of which projects slightly from the bottom wall to provide a valve seat 130. A light flutter valve 131 stamped from fiber or other suitable material coacts with the seat 130 and is loosely held in position by a partition wall 132 and a tongue 134 extending down from the partition wall toward the bottom of the box 128. The partition wall is spaced a fixed distance from the bottom wall of the box by downturned edges 133 and the tongue 134 being formed from the partition wall leaves a hole 135 through which air may freely pass from one side of the partition wall to the other.

A protrusion 136 in the partition wall 132 provided with circumferentially spaced projections 136' holds the flutter valve 131 off the partition wall and the projections keep the valve disc from sticking in its open position. The valve disc is thus always free to float to and from engagement with the valve seat 130 as the pressure in the crankcase alternates between negative and positive. This arrangement permits free expulsion of air from the crankcase and restricts influx of air to the slight amount which can pass through the hole 129 during the interval the valve disc moves from its "open" position to its "closed" position on the seat 130. However, any dirt or foreign matter entrained in the air thus entering the crankcase is trapped by a mass of keratin fiber or other filtering material 137 confined between the partition and a cover 138.

The cover 138 fits over the box 128 and has an air inlet port 139 in its end remote from the hole 135 in the partition wall to thus assure that any air flowing through the device either inward or outward must pass through the filter.

Mounting ears 140 on opposite ends of the cover provide for fastening the entire assembly in position across the mouth of the valve spring pocket or compartment with the box 128 projecting a substantial distance into the compartment as best shown in Figure 3. Any oil which is carried into the box 128 drains back into the valve spring compartment through drain holes 128' and 132' in the box and its partition wall, and these holes are so located that at least one set thereof is always effective regardless of whether the engine is operating with its cylinder vertical, inclined from the vertical, or horizontal.

The air breather assembly thus performs five important functions.

(1) It baffles out the oil remaining in the air expelled from the crankcase.
(2) It drains this oil back to the crankcase.
(3) Its flutter valve enables the maintenance of a partial vacuum in the crankcase.
(4) Its filter traps dirt which might otherwise be carried into the crankcase.
(5) It provides a cover for the valve spring compartment.

Proper lubrication of the crankshaft and cam shaft bearings is an important consideration. In vertical cylinder engines prior to this invention it was customary to mount separate baffles and oil collectors in the crankcase for collecting oil and leading it to the bearings, but with the present invention this function is performed by baffles cast integrally with the cover casting 7 and the opposite wall 11. Thus, considering first the cover 7 (Figure 10) it will be seen that ribs 141 and 142 project perpendicularly from the inner surface of the casting wall and diverge from the top of a boss 143 which forms part of the bearing 13. The ribs 141 and 142 in coaction with the wall of the casting from which they rise thus form a pocket or funnel 144 in which oil collects during operation of the engine to flow down through an opening 145 in the bearing hub into an oil groove 146.

A somewhat similar arrangement of baffle forming ribs 147 and 148 projecting perpendicularly from the inner surface of the casting wall and diverging from the top of the hub 20 provides a pocket 149 in which oil collects to flow through an opening 150 into the bearing 18. The other ribs of the cover casting 7 provide strength and also facilitate the flow of the die cast metal during the casting operation.

A somewhat similar arrangement of baffles is provided on the inner surface of the main casting wall 11 as best shown in Figure 18. Here a rib 151 extending at an angle from the top of the relatively shallow boss 152 which provides the inner end of the bearing 14 collects oil impelled by the rotation of the crankshaft and directs the oil thus collected into an oil groove 153 leading to the bearing 14. For the cam shaft bearing 19 a baffle 154 extends from the top of the boss 21 to the underside of the adjacent baffle 123 to collect the oil which tends to follow around with the cam shaft, and direct the same through a groove 155 into the bearing 19. As in the cover 7 the other ribs with which the inner surface of the wall 11 is provided are primarily for the purpose of strengthening the casting; and all of these ribs help to dissipate heat by conducting it efficiently to cooler parts of the casting.

If the engine is to operate with its cylinder axis horizontal in which event the crankcase cover 8 is used rather than the cover 7, the problem of adequately lubricating the crankshaft and cam shaft is even more difficult. In this case the cover casting 8 must provide a sump for the oil without, however, incurring the risk of losing oil through the bottom crankshaft bearing 13. Accordingly the cover 8, as described hereinbefore, has a deep dish-shaped formation with relatively high side walls 38 extending up from its bottom wall 37 and the bearing 13 is in a boss 156 which rises from the bottom wall 37 to the level of the gasket flange provided by the top edges of the side walls 38. To assure adequate lubrication of this bearing it is equipped with oil grooves having inlets 157 cut radially through the top of the boss 156 so that during operation of the engine oil can readily reach the bearing 13; however, by virtue of the height of the boss 156 leakage of oil past a defective oil seal 15 in the bottom of the bearing 13 when the engine is idle is limited to the amount above the level of the bottom of the inlets 157.

In the same manner the cam shaft bearing 18 has oil grooves with an inlet 158 leading to the bearing to permit the flow of oil thereto.

The baffles which rise from the bottom wall 37 and radiate from the bearing bosses as well as the other baffles, all of which are clearly shown in Figure 5, are principally for strengthening purposes and, of course, also help dissipate heat.

Lubrication of the upper bearings 14 and 19 is effected by an oil slinger 159 of the type disclosed and claimed in Patent No. 2,669,322. This oil slinger consists of a rotary impeller 160 journaled upon a stub shaft 161 and provided with paddles 162 and gear teeth 162' on its periphery. The gear teeth mesh with one of the timing gears so that during operation of the engine the impeller is rotated to cause its paddles to dip into the oil in the sump and throw it upwardly against the casting wall 11 which now forms the top of the crankcase. The angular disposition of the stub shaft is such that oil thrown upwardly by the paddles strikes the top of the crankcase between the bearings 14 and 19; and to facilitate the flow of the oil thus impinging the top of the crankcase to the crankshaft bearing 14 the casting wall 11 has a pocket 163 formed therein in which part of the oil thrown up by the slinger collects to be retained therein by surface tension and flow from the pocket through an oil hole 164 in the bearing wall.

For the cam shaft, enough of the oil splashed up against the top of the crankcase accumulates against the baffle 154 to flow through the oil groove 155.

Proper location of the slinger with respect to the bearings it supplies and the timing gear which drives it is, of course, important and accordingly the stub shaft 161 upon which the slinger is journaled is part of a specially designed die casting 165 (see Figure 7). This die casting has a pair of angularly disposed arms 166 and 167, the former having the stub shaft 161 formed thereon at an angle to the flat top face of the casting. At the junction of the two arms and at the outer end of the arm 167 are pilot bosses 168 and 169 respectively. These pilot bosses enter pilot holes 170 and 171, respectively, provided by counterbores in the outer ends of two post-like bosses 172 formed as an integral part of the main crankcase-cylinder casting (see Figure 18). These post-like bosses are preferably contiguous to the adjacent side wall of the casting and join therewith. The mounting bracket is held in position by screws 173 which pass through the bracket and are threaded into the post-like bosses.

This manner of mounting the oil slinger assures accurate positioning of the same and greatly facilitates the assembly of the engine since at the time that the cover plate 8 is secured to the main crankcase-cylinder casting the slinger is already in proper position whereas if the oil slinger were mounted on the cover it could not be observed during cover attachment, and might be improperly assembled. It should also be noted that this arrangement obviates the need for any special means to hold the impeller on its stub shaft, this function being performed by the cam shaft timing gear with which the impeller gear teeth 162' mesh.

As brought out hereinbefore one of the features of the invention is the fact that the engine may be easily and economically adapted to a wide variety of uses. Practically any mounting requirement or special use can be met by merely designing the crankcase cover to fit. Thus, as already clearly shown, the same engine may be adapted either to general utility (in which case the engine operates with its cylinder axis vertical), or such special purpose as driving the blade of a rotary type lawn mower (in which event the engine operates with its cylinder horizontal) by simply selecting one of two crankcase covers.

Figure 17:
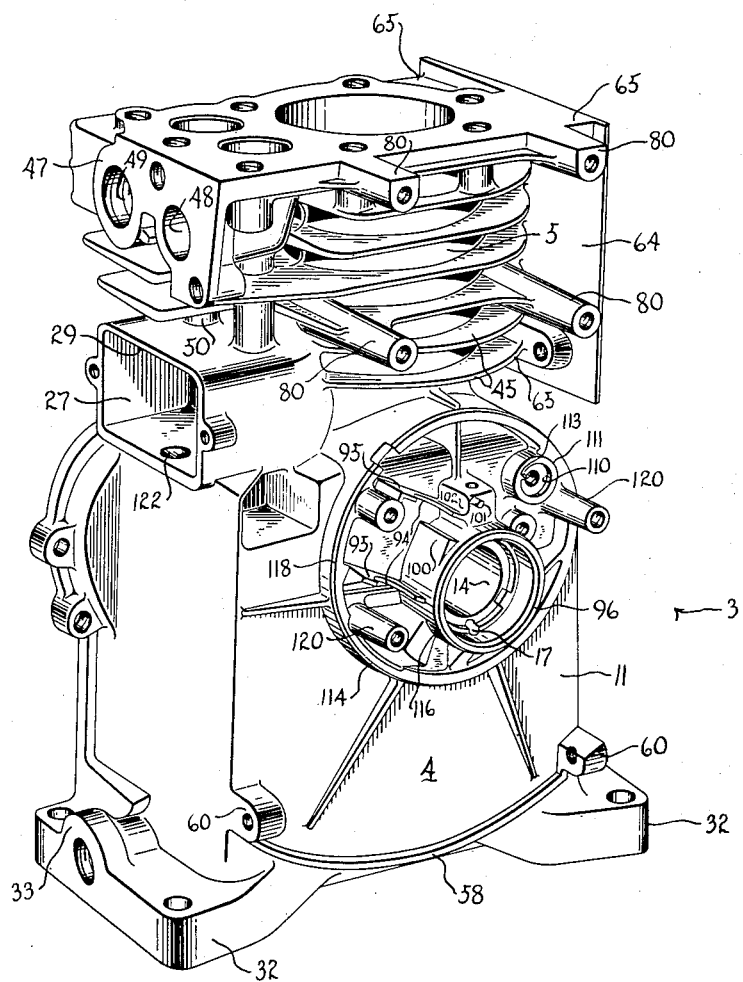
Figure 17 is a perspective view of the crankcase-cylinder casting viewing the same from the side thereof at which the magneto is located.
Figure 21:
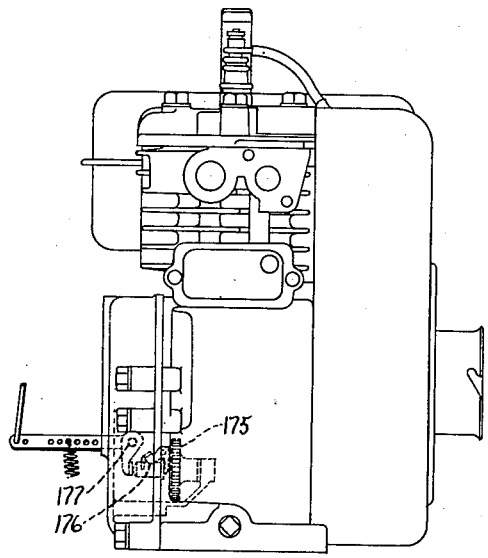
Figure 21 is a side view of the engine illustrating the manner in which a mechanical governor may be applied to the engine in lieu of the air vane governor ordinarily used, without in anywise affecting the crankcase-cylinder casting.

To further illustrate this unusual flexibility of adaptation attention is invited to Figures 21, 22 and 23. Figure 21 illustrates how the engine may be equipped with a mechanical governor of the type covered by Patent No. 2,382,952 without in anywise altering the crankcase-cylinder casting. For this purpose a governor gear 175 may be journaled on a shaft carried by the crankcase cover to drive the fly weights 176. Response of these fly weights to centrifugal force, as clearly described in the aforesaid patent, rocks a control shaft 177 which also is mounted in the cover and by its motion adjusts the throttle valve.

In Figure 22 there is illustrated the adaptation of an external type of breaker such as that covered by Patent No. 2,605,753, and as clearly shown the entire unit 178 is mounted upon a crankcase cover.

Even a fuel pump can be added to the engine if desired without necessitating change in the crankcase-cylinder casting for as shown in Figure 23 a pump such as that illustrated in Patent No. 2,496,688 may be readily mounted upon a pad 179 on the cover casting 7 to dispose the actuating arm 180 of the pump in proper relation to the cam 181 on the crankshaft which operates the pump.

From the foregoing description taken in connection with the accompanying drawings, it will be readily apparent that this invention to a large degree has fulfilled the demand made upon the engine industry to supply a lighter, less expensive engine without sacrificing power output, ruggedness or reliability.

What I claim as my invention is:

1. A single cylinder internal combustion engine having a crankcase with two spaced apart side walls, each of which carries a crankshaft bearing, a cylinder and a crankshaft journaled in the bearings with its ends projecting from the crankcase, one end of the crankshaft having a flywheel mounted thereon and the other end being the power take-off end of the shaft, characterized by the fact that: the cylinder and all portions of the crankcase including the wall thereof remote from and facing the cylinder, except that wall of the crankcase which carries the bearing for the power take-off end of the crankshaft is a single casting; and further by the fact that said wall of the crankcase which carries the bearing for the power take-off end of the crankshaft is provided by a cover removably secured to said casting so that said cover is interchangeable with others of different design to adapt the engine to any of a variety of different installations without necessitating alteration of the cylinder-crankcase casting.

2. A single cylinder four-stroke cycle internal combustion engine having a crankshaft, a cam shaft parallel to the crankshaft, a cylinder and a crankcase, through opposite walls of which the ends of the crankshaft pass, one end of the crankshaft having a flywheel thereon and the other end being the power take-off end of the crankshaft, characterized by the fact that: the cylinder and all portions of the crankcase including the wall thereof remote from and facing the cyclinder, except that wall of the crankcase through which the power take-off end of the crankshaft passes, is one casting; by the fact that said wall through which the power take-off end of the crankshaft passes is provided by a cover removably secured to said casting; by the fact that the crankshaft and the cam shaft are supported by said cover and the wall of the casting opposite the cover; and by the fact that the supports for the cam shaft comprise wells in the cover and said opposite wall of the casting.

3. The engine according to claim 2 further characterized by the fact that the cover and the casting wall opposite the cover have bored bosses projecting from their inner faces and comprising the supports for said shafts, said bosses having oil passages therein leading from mouths at their peripheries into their bores; and further characterized by ribs on the inner faces of the cover and the casting wall opposite the cover radiating from said bosses and coacting with the bosses and the wall surfaces from which the bosses and ribs project to form pockets at the mouths of said oil passages for accumulating and directing oil into the passages.

4. The engine defined in claim 2 further characterized by the fact that said cover has a relatively deep depression in its inner face so that when the engine is positioned to operate with its cylinder horizontal and said cover at the bottom of the engine, the depression in its inner face provides an oil sump; and characterized further by the fact that the cover has a boss projecting from its inner face and bored through to provide a bearing for the adjacent end of the crankshaft, said boss extending for substantially the full depth of the depression in the cover so that oil in the depression rising to a level substantially equal to the full depth of the depression, when the engine is used with its cylinder horizontal, will not drain out along the crankshaft when the engine is idle.

5. A single cylinder, four-stroke cycle internal combustion engine adapted for operation with its cylinder horizontal, said engine having in addition to its cylinder a crankshaft, a cam shaft parallel to the crankshaft, and a crankcase with spaced apart top and bottom walls through which the upper and lower ends of the crankshaft pass, said engine being characterized by the fact that: the cylinder and all portions of the crankcase except its bottom wall through which the lower end of the crankshaft passes is one casting; by the fact that said bottom wall comprises a cover having a relatively deep depression removably secured to the casting with the edge of the depression joining the casting on a plane parallel to said top and bottom walls and below the cylinder, by the fact that the cam shaft is supported by the cover and the top wall of the crank case and the bearings for the crankshaft are in said cover and the top wall of the crankcase; further by the fact that the depression in the cover provides an oil sump and has an oil filler port therein communicating with the depression below the top edge thereof with the mouth of the filler port on a level no higher than the edge of the depression so that the level of the oil in the sump will not be above the edge of the depression; and said cover being further characterized by a pair of bosses projecting up from the bottom of its depression, one of said bosses being bored through and providing the bearing for the lower end of the crankshaft, and the other boss having a well, closed at its bottom extending down into it and providing a support for the lower end of the cam shaft, the boss providing the lower crankshaft bearing extending substantially to the level of the edge of the depresison in the cover so that when the engine is idle the oil in the sump will not be drained therefrom through said crankshaft bearing.

6. A single cylinder, four-stroke cycle internal combustion engine adapted for operation with its cylinder horizontal, said engine having in addition to its cylinder a crankshaft, a cam shaft parallel to the crankshaft, and a crankcase with spaced apart top and bottom walls through which the upper and lower ends of the crankshaft pass, said engine being characterized by the fact that: the cylinder and all portions of the crankcase except its bottom wall through which the lower end of the crankshaft passes is one casting; by the fact that said bottom wall comprises a cover removably secured to the casting and having a relatively deep depression; by the fact that the cam shaft is supported by the cover and the top wall of the crank case and the bearings for the crankshaft are in said cover and the top wall of the crankcase; further by the fact that the depression in the cover provides an oil sump; and said cover being further characterized by mounting means formed integrally therewith for mounting the engine with its cylinder horizontal.

7. The engine defined in claim 6 but wherein said mounting means for the engine comprises a substantially circular flange on the cover having a flat downwardly facing rim concentric to the crankshaft axis and adapted to seat upon a flat surface.

8. The engine defined in claim 6 but wherein said mounting means for the engine extends from the region of the oil sump towards the cylinder head to thereby enable the mounting means to provide a large mounting area without greatly increasing the outline of the engine.

9. The engine defined in claim 5 further characterized by the provision of a rotary oil slinger having a plurality of paddles on its periphery and having gear teeth; a mounting bracket for the oil slinger having a stub shaft upon which the oil slinger is freely journaled; and means securing said mounting bracket to the cylinder-crankcase casting, with the gear teeth of the oil slinger in mesh with one of the timing gears of the engine and with the paddles dipping into the oil sump provided by the depression in the cover, said mounting bracket so positioning the oil slinger that oil thrown upwardly therefrom strikes the top wall of the cylinder-crankcase casting adjacent to the crankshaft and the cam shaft bearings therein.

10. In an internal combustion engine adapted for operation with its cylinder horizontal: a crankcase comprising complementary main and cover castings, the main casting having the cylinder of the engine cast integrally therewith, said castings being joined together on a plane of parting parallel to the cylinder axis and below the cylinder; mounting means formed integrally with the cover casting for mounting the engine with its cylinder horizontal and the cover casting therebelow, said cover casting having a relatively deep depression extending down from said plane of parting to provide an oil sump; bearings in the bottom wall of the cover casting and the top wall of the main casting for the crankshaft and the cam shaft of the engine; a rotary oil slinger having paddles on its periphery and gear teeth for meshing engagement with one of the timing gears of the engine; a mounting bracket for the oil slinger having a stub shaft upon which the oil slinger is freely journaled; and means securing said mounting bracket to the main casting in position to have the gear teeth on the oil slinger mesh with one of the timing gears of the engine and with the paddles traveling in an orbit which projects a substantial distance down into the oil sump in the cover casting to thereby dip into the oil in said sump and throw the same upwardly into the crankcase interior, said bracket so positioning the oil slinger that oil thrown upwardly therefrom strikes the top wall of the main casting adjacent to the crankshaft and cam shaft bearings therein.

11. The engine defined in claim 10 further characterized by the provision of an oil receiving pocket in the top wall of the main casting in position to receive oil thrown upwardly by the oil slinger; and an oil passage leading from said pocket to the crankshaft bearing in said top wall of the main casting.

12. In a horizontal engine: a crankcase comprising complementary main and cover castings joined on a horizontal plane parallel to the axis of the cylinder but below the cylinder so that the opposite walls of said castings provide the top and bottom respectively of the crankcase; mounting means on the cover casting for mounting the engine with its cylinder horizontal and the cover casting lowermost, said cover casting having a depression therein providing an oil sump beneath the plane of parting between the two castings, the top wall of the main casting and the bottom wall of the cover casting having bearings therein for the crankshaft and the cam shaft; a rotary oil slinger for lifting oil out of the sump and throwing it upwardly against the top wall of the main casting; a mounting bracket for the rotary oil slinger having a stub shaft upon which the oil slinger is journaled; and means fastening said mounting bracket to the main casting with the oil slinger positioned to dip into the sump provided by the cover casting and throw oil lifted therefrom against the top wall of the main casting; and means for driving the rotary oil slinger.

13. In an internal combustion engine of the character described: a crankcase defined partially by a hollow casting having an open bottom and a closed top wall and having the cylinder of the engine formed integrally therewith with its axis parallel to the plane of the open bottom and the closed top wall; an oil sump removably secured to and closing the open bottom of said casting; parallel crankshaft and cam shaft bearings in the top wall of the casting and in the oil sump; a crankshaft having a timing gear thereon and a cam shaft having a timing gear thereon journaled in said bearings with their timing gears meshing and with at least one of the timing gears adjacent to the plane of parting between the casting and the oil sump; a rotary oil slinger having paddles on its periphery and having gear teeth adapted to mesh with the teeth of said timing gear; a mounting bracket for the rotary oil slinger having a stub shaft upon which the oil slinger is journaled; and means mounting said bracket upon the crankcase casting including interengaging locating means on the bracket and the casting whereby said bracket is secured in a position disposing the oil slinger with its gear teeth in mesh with the said timing gear and its paddles dipping down into the oil sump to throw oil upwardly against the top wall of the casting.

14. In an engine of the character described: a cylinder and a crankcase formed as one casting, the crankcase being open at its bottom; a cover closing the open bottom of the crankcase, said cover having a depression therein providing an oil sump for the engine; bearings for the crankshaft of the engine carried by the cover and the wall of the crankcase opposite the cover; said cover having an oil filler port provided by a well extending down from the top of the cover alongside the depression in the cover, the top of said well providing the mouth of the port and lying substantially on a plane with the top edge of the depression; and the cover having an oil drain port in its bottom provided by a bore parallel to the oil filler port but lying between said port and the adjacent wall of the depression and breaking through both the wall of the depression and the oil filler port to thereby communicate the oil filler port with the interior of the depression; and removable caps for closing both the oil filler port and said oil drain port.

15. In an engine of the character described, the structure set forth in claim 14 further characterized by the provision of a boss projecting from the bottom of the depression in the cover, said boss being bored through and providing the bearing for the lower end of the crank shaft and having a height to reach substantially to the level of the mouth of the filler port so that oil in the sump cannot drain out through the lower crank shaft bearing when the engine is idle.

16. A single cylinder four-stroke cycle internal combustion engine having a crankshaft, a cylinder and a crankcase through opposite walls of which the ends of the crankshaft pass, one end of the crankshaft having a flywheel thereon and the other end being the power take-off end of the crankshaft, characterized by the fact that: the engine is designed to be used with its cylinder horizontal with the walls of the crankcase through which the crankshaft passes being the top and bottom walls of the crankcase and with the flywheel adjacent to the top wall and the power take-off end of the crankshaft projecting down from the bottom wall; by the fact that the cylinder and all portions of the crankcase including the wall thereof remote from and facing the cylinder, except the bottom wall through which the power take-off end of the crankshaft passes is one integral casting; by the fact that said bottom wall is provided by a cover removably secured to said casting; by the fact that the crank shaft and the cam shaft are supported by said cover and the top wall of the crankcase; by the fact that said cover has a relatively deep upwardly opening depression which provides an oil sump; and characterized further by the fact that the cover has a boss projecting upwardly from its inner face and bored through to provide a bearing in which the lower end of the crankshaft is rotatably supported, said boss extending for substantially the full depth of the depression in the cover so that oil in the depression rising to a level equal to the full depth of the depression will not drain out along the crankshaft when the engine is idle.

References Cited in the file of this patent

UNITED STATES PATENTS

| Number | Name | Date |
|---|---|---|
| 1,447,245 | Gore | Mar. 6, 1923 |
| 1,463,958 | Kettering | Aug. 7, 1923 |
| 2,157,666 | Jacobi | May 9, 1939 |
| 2,249,319 | Lohner | July 15, 1941 |
| 2,256,002 | Molnar | Sept. 16, 1941 |
| 2,305,186 | Muenk | Dec. 15, 1942 |
| 2,375,718 | Winkels et al. | May 8, 1945 |
| 2,404,833 | Forster | July 30, 1946 |
| 2,424,416 | Piry | July 22, 1947 |
| 2,511,823 | Klotsch | June 13, 1950 |
| 2,559,079 | Leja | July 3, 1951 |
| 2,569,461 | Dingman | Oct. 2, 1951 |
| 2,583,466 | Brownlee | Jan. 22, 1952 |
| 2,590,134 | Slonneger | Mar. 25, 1952 |
| 2,606,541 | Lutz | Aug. 12, 1952 |
| 2,630,881 | Bosma | Mar. 10, 1953 |
| 2,669,322 | Brown | Feb. 16, 1954 |

FOREIGN PATENTS

| Number | Country | Date |
|---|---|---|
| 32,802 | Netherlands | May 15, 1934 |